Sept. 1, 1942.　　　A. O. WILLIAMS　　　2,294,818
RESILIENT WHEEL
Filed Jan. 13, 1941　　　2 Sheets-Sheet 1

INVENTOR:
Alfred O. Williams.
BY Walter E. Schirmer
Atty.

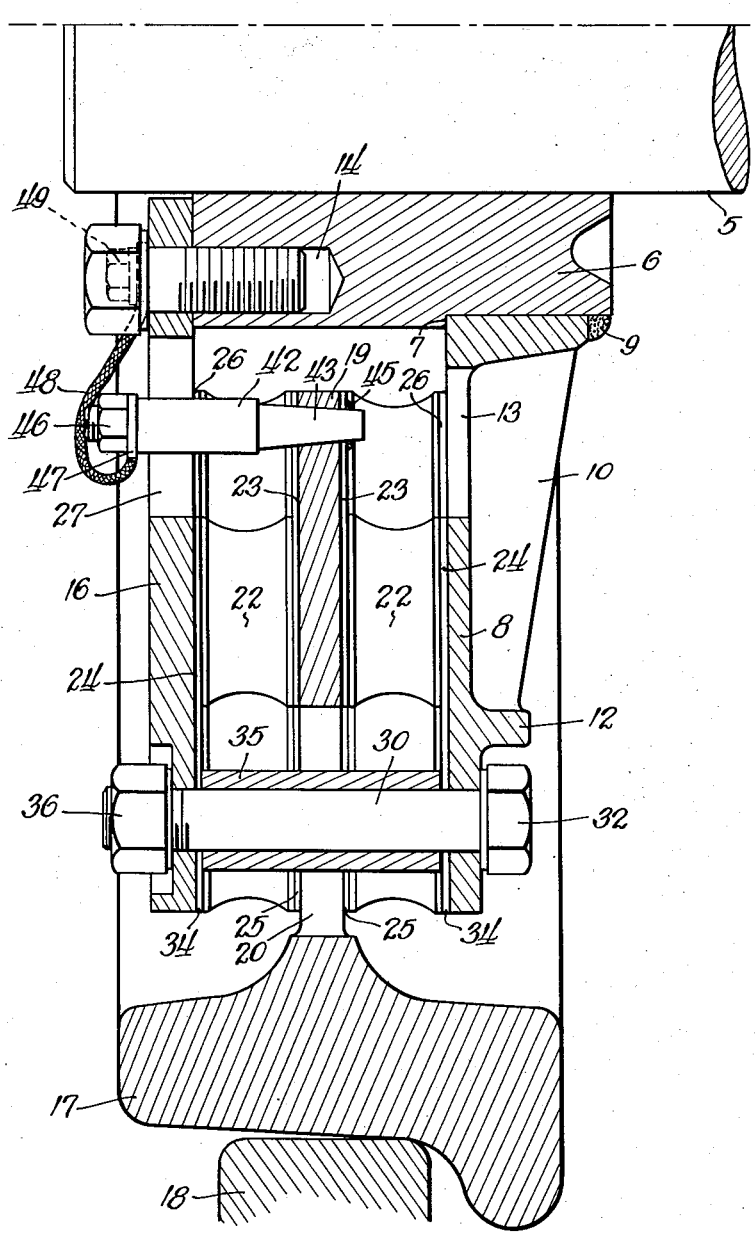

Patented Sept. 1, 1942

2,294,818

UNITED STATES PATENT OFFICE 2,294,818

RESILIENT WHEEL

Alfred O. Williams, Battle Creek, Mich., assignor to Clark Equipment Company, Buchanan, Mich., a corporation of Michigan Application January 13, 1941, Serial No. 374,215

14 Claims. (Cl. 295—11)

This invention relates to resilient wheels, and more particularly is directed to wheels of the type employed in rail vehicles, such as surface cars, subway and elevated trains, and rail cars.

It has heretofore been known to provide resilient car wheels of this type in which the rim or tire member is provided with a radially inwardly extending flange disposed between spaced parallel hub flanges and connected thereto by means of spring devices comprising elastic shear elements which have connection between the flanges for taking the loads in elastic shear. Such a construction is disclosed in the Burrows and Williams patent, No. 2,167,633, issued August 1, 1939.

The present construction constitutes an improvement upon the prior art structures, and consists in forming individual resilient segments between the tire and hub flanges, which segments are in the form of sandwich elements having thin metallic plates surface bonded to the opposite faces thereof and interconnected to the respective flanges, whereby the driving connection, torque reactions and vertical loading is accommodated by the imposition of shear in these elastic devices, the tire member and the hub being insulated from each other by reason of this construction so as to prevent metal to metal contact therebetween.

One of the particular features of the present invention is a construction which facilitates the clamping of the thin metallic plates to the respective hub and tire flanges to insure maintaining these plates in proper position on the flanges without the use of dowels, shoulders or similar contrivances whereby the plates may be thin metal stampings from flat sheet stock and require no bending or forming operations.

Still another object of the present invention is the provision of a construction in which transverse air passages are provided through the wheel at the inner and outer peripheries of the segments, whereby the segments can dissipate heat to the air passing thereby, allowing the wheel to be employed in constructions in which tire brakes are applied directly to the tread of the tire.

Still another feature of the present invention is the provision of a construction in which the tire member can be arranged so as to facilitate the clamping of the segments thereto by the use of a rivet gun or the like, insuring a positive connection between the thin metal plates of the rubber members and the tire flange.

Still another feature of the present invention is the use of a series of peripherally arranged studs which serve as dowel means for centering the outer plates of the segments on the adjacent faces of the hub flanges with shoulder means on the studs for insuring positive clamping of these plates in position, and also for maintaining a uniform lateral compression upon the segments.

This provision for positive spacing of the flanges to provide uniform lateral compression at the studs is combined with means adjacent the hub for insuring the same predetermined spacing of the inner peripheral portions of the flanges whereby the segments are placed in uniform lateral compression throughout their radial extent.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 2 is a transverse sectional view taken substantially on line 2—2 of Figure 1.

Figure 1:
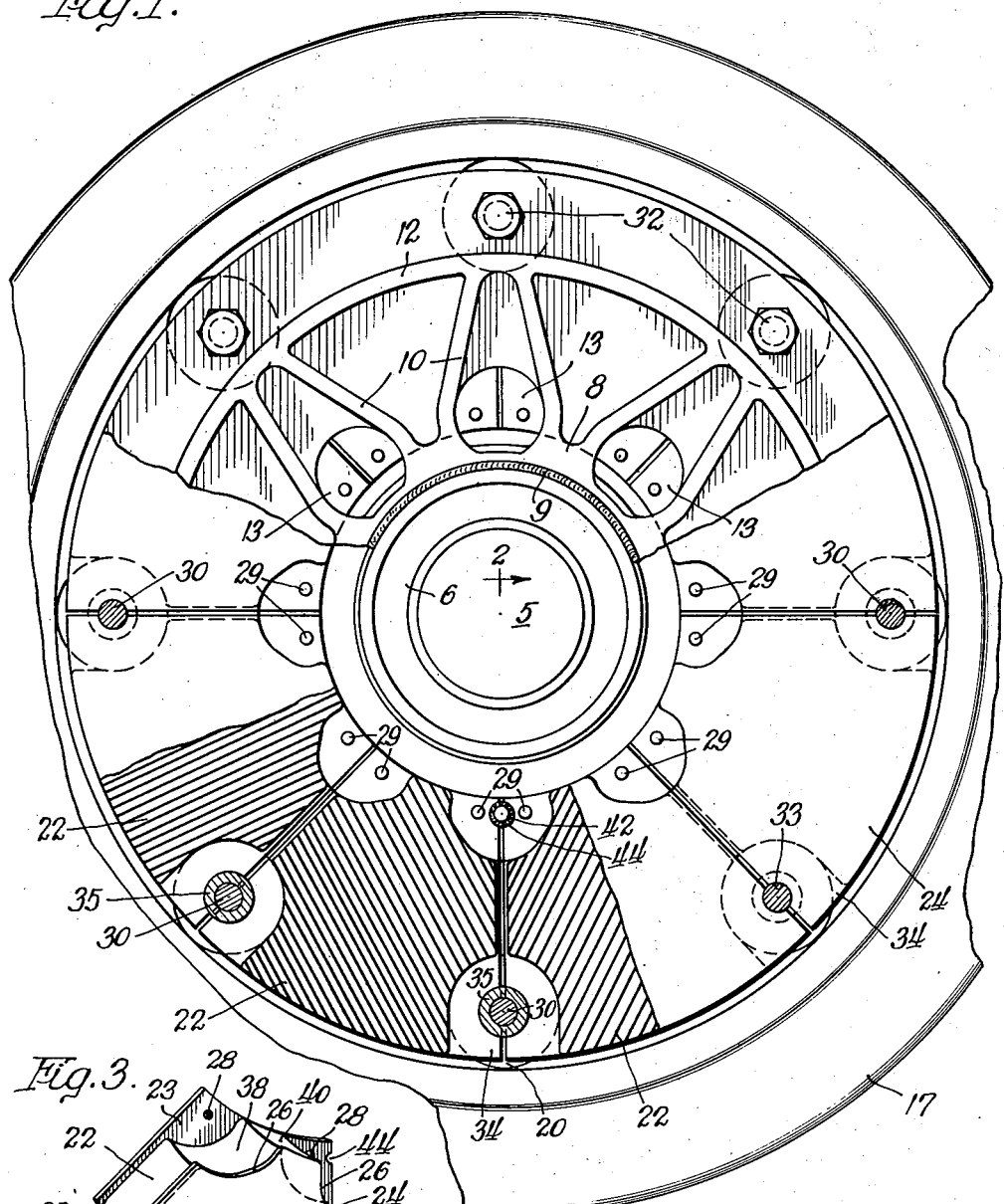
Figure 1 is an elevational view with portions broken away showing the wheel embodying the present invention.

Referring now in detail to the drawings, an axle shaft is indicated generally at 5 and has mounted thereon the annular hub member 6, which hub member is pressed onto the axle shaft in such manner as to have conjoint rotation therewith. The hub member 6 is provided with a radial shoulder 7 against which is seated the radially extending hub flange member 8, this member being welded or otherwise fixed in position, as indicated at 9.

The flange member 8 is preferably provided with radially extending rib portions 10 terminating adjacent the outer periphery of the flange in an angularly extending rim 12. It will be noted that between adjacent pairs of radial ribs 10 at the inner peripheral portion of the flange 8, the flange is provided with openings 13 for a purpose to be described in more detail hereinafter.

The opposite end of the hub member 6 is suitably tapped, as indicated at 14, to receive studs, which studs are adapted to clamp the relatively thick plate member 16 in position to form a second radially extending hub flange parallelling the flange 8. The clamping of the plate 16 in position provides a predetermined spacing between the shoulder 7 and the end of the hub 6, whereby the inner peripheries of the flanges 8 and 16 are spaced a predetermined distance apart.

A suitable tire or rim member 17 is provided adapted to run upon a rail 18, and having a radially inwardly directed flange portion 19 extending between the flanges 8 and 16, and provided adjacent the outer radial periphery thereof with the enlarged openings 20. Interposed between each of the flanges 8 and 16 and the flange 19 are elastic shear segments, indicated more in detail in Figure 3, comprising segmental rubber members 22 having surface bonded to opposite faces thereof, the plates 23 and 24. The plates 23 are adapted to engage the opposite faces of the tire flange 19, and are provided adjacent their outer edges with cut-out corners 25 substantially conforming to the outline of the opening 20 in the flange member 19. The plates 24, on the other hand, are provided with cut-out corners 26 at their inner periphery which conform in general outline to the openings 13 and 27 formed in the flanges 8 and 16, respectively. The plates 23 are further provided adjacent their inner peripheries with rigid openings 28, which openings are adapted to receive the rivet members 29 whereby the two plates 23 are conjointly secured to the inner portion of the flange 19 by means of rivets of the general type known as Huck rivets, although it is understood that any suitable riveting means may be employed. The openings 13 and 27 provide for access to these rivets to drive the same, or the plates 23 may be riveted to the tire flange 19 before the assembly is completed, and the tire flange with the two segments 22 may then be placed in position and plate 16 then applied to the hub 6.

A circumferential series of peripheral studs or bolts 30 is provided, these studs extending transversely through the outer peripheral ends of the flanges 8 and 16 and having head portions 32 bearing against the outer radial surface of the flange 8 beyond the annular rib 12. The studs 30 extend through the contiguous notched-out portions 33 formed in the outer corners 34 of the plates 24, whereby the plates 24 are centered relative to the studs and piloted in position, the studs 30 acting as dowels for this purpose.

Intermediate the flanges 8 and 16, a suitable sleeve member 35 is provided on the studs which bears against the faces of the corners 34 of the adjacent plates 24 to clamp them firmly to the respective faces of the flanges 8 and 16. The sleeve 35 is preferably of the same axial length as the distance between the plate 16 and the shoulder 7 on the hub 6 whereby, upon drawing the nuts 36 of the studs 30 up tightly, the segments 22 are subjected to uniform lateral compression throughout their radial extent.

Figure 3:
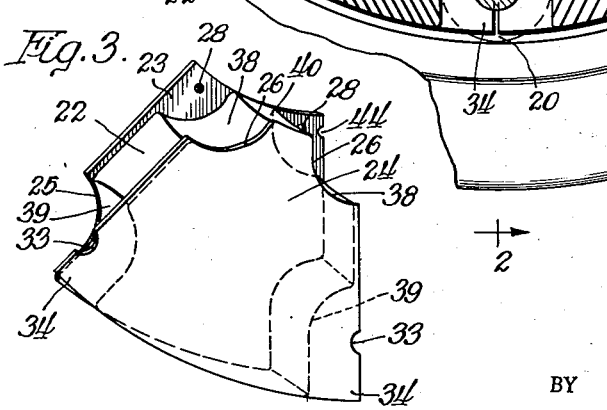
Figure 3 is an isometric view of one of the segment elements.

The segments 22, as shown clearly in Figures 1 and 3, have their inner corners notched out as indicated at 38, and also having their outer corners notched out, as indicated at 39, corresponding to the notched portions 25 and 26 of the plates 23 and 24. The notch portions 38 of the segments 22 provide clearance for access to the rivets 29 by which the inner plates 23 are secured to the tire flange 19 and are alined with the openings 13 and 27 in such manner that air may circulate transversely therethrough, contacting the surfaces 38 of the segments and the inner end 40 thereof, whereby cooling is provided for this portion of the segments.

The outer notched ends 39 of the segments 22 are alined with the notched portions 25 of the plates 23 and with the openings 20 in the tire flange, whereby air may pass into the annular space between the outer edge of the plates 8 and 16 and the inner portion of the tire 17, and thence may pass around the studs 30 and sleeve 35 through the opening 20 to provide for cooling of the outer peripheral portions of the segments 22.

It will thus be apparent that driving and braking reactions between the hub 6 and the tire member 17 are taken by circumferential shear in the segments 22, since the outer plates of these segments are secured to the hub flanges and the inner plates are secured to the tire flange. Similarly, vertical loads between the shaft and the tire are also absorbed by radial shear in the segments 22, thus providing a quiet running resilient wheel of distinct advantage. However, in a large number of cases, electrical control circuits for switches, signals and the like are provided by contact of the tires with the rails upon which they run. To provide an electrical connection between the tires through the shaft 5, it is necessary to provide for some electrical bond between the tire flange 19 and the hub 6. This is provided by means of a stud 42 having a tapered end 43 which is driven through a corresponding tapered opening formed, as indicated at 44, in adjacent edges of the inner peripheral corners of the inner plates 23 between two of the segments. The stud 42 is preferably secured in position by welding, as indicated at 45, and the outer end of the stud is threaded to receive a nut 46 which secures one end 47 of a jumper wire 48 to the stud 42, thereby electrically connecting the jumper wire to the flange 19. The opposite end of the jumper wire is suitably secured to the hub flange 16 by means of a stud 49 clamping the same to the outer face of the flange. This provides the desired electrical bond for signal circuits and the like controlled from the tire members.

The present construction lends itself well to assembly methods since it is apparent that, if desired, the two segments 22 can be rigidly secured to the tire flange 19 as a sub-assembly, and the tire flange with the segments attached thereto can then be brought into position against the face of flange 8 and the studs 30 inserted into position. It is then only necessary to move the plate 16 into position and secure it to the hub by the studs, after which the nuts 36 can be applied to the studs 30 for drawing the same up to press the sleeve 35 against the plates 24, thereby locking the assembly in final position.

I am aware that various changes in certain details of the present construction can be made, but it is believed that the construction affords a novel type of resilient wheel which is relatively light in weight due to the elimination of a certain portion of the metal in the hub flanges and the tire flange by reason of the openings 13, 20 and 27. Also, the tire flange thus has radial clearance about the sleeves 35 to accommodate the resilient springing action produced by the segments 22. It is therefore understood that the present embodiment of the invention is not to be limited to the exact details shown and described, but only as defined by the scope and spirit of the appended claims.

I claim:

1. A resilient wheel structure comprising a hub having a pair of axially spaced radial flanges, a rim member having a radially inwardly extending flange intermediate said hub flanges, segmental spring elements between said rim flange and each of said hub flanges comprising rubber segments having thin metallic plates surface bonded to opposite faces thereof, means for securing the adjacent radial inner corners of the plates lying next to said rim flange to said rim flange, and means between said hub flanges adjacent their radial outer periphery for clamping the radial outer corners of said outer plates to the inner faces of said hub flanges.

2. The wheel of claim 1 wherein said means for securing said plates to said rim flange comprise rivets, and said hub flanges are provided with a circumferential series of alined openings providing access for driving said rivets and function also as lateral air passageways across the radial inner peripheries of said segments.

3. The wheel of claim 1 wherein said segments are recessed about said means securing said plates to said rim flange.

4. A resilient wheel comprising a hub having axially spaced radially extending flanges, a rim having a radially inwardly extending flange intermediate said hub flanges, a series of arcuately shaped segmental spring elements between said hub flanges and the opposite faces of said rim flange, each element comprising a rubber segment having thin metallic plates surface bonded to opposite faces thereof, means for securing the radial inner periphery of one plate of each segment to the rim flange, and means for securing the outer periphery of the other plate of each segment to the adjacent hub flange.

5. The combination, with a resilient car wheel having a hub portion and a tire portion movable relative to each other in a radial direction, of a spring construction between said portions comprising a series of three parallel disc-like members, elastic spring devices between the intermediate member and each of the side members, each spring device comprising an arcuate segment of rubber having thin arcuate metallic plates surface bonded to opposite faces thereof, means for securing the plates adjacent the intermediate member thereto adjacent their radial inner peripheries, and means for securing the plates adjacent said side members thereto adjacent their outer radial peripheries, said rubber segments being arcuately recessed at the corners of said plates.

6. A spring structure for a resilient car wheel comprising two axially spaced annular disc-like members, an intermediate disc-like member adapted to have radial movement relative said side members, elastic spring segments arranged circumferentially between each side member and said intermediate member and laterally compressed therebetween, and means securing said segments to said intermediate member adjacent the radial inner periphery thereof, and to said side members adjacent the radial outer peripheries thereof.

7. A resilient wheel comprising a hub, a pair of axially sapced radial flanges thereon, a rim member having a radial flange extending between said hub flanges, rubber spring segments arranged circumferentially between each hub flange and said spring flange, each segment having thin metallic plates secured to opposite faces thereof, and means for securing one plate of each segment to said rim flange adjacent the inner radial periphery thereof and for securing the other plate of each segment to the adjacent hub flange adjacent the radial outer periphery thereof, said rubber segments having the corners thereof relieved to provide radial clearance about said securing means.

8. The wheel of claim 1 wherein said hub flanges are provided with a circumferential series of alined openings providing lateral air passageways across the radial inner peripheries of said segments.

9. The wheel of claim 1 wherein said means for securing said inner corners of said plates to said rim flange comprise rivets.

10. In combination, a spring construction comprising a series of three parallel disc-like members, elastic spring devices between the intermediate member and each of the side members, each spring device comprising an arcuate segment of rubber having thin arcuate metallic plates surface bonded to opposite faces thereof, means for securing the plates adjacent the intermediate member thereto adjacent their radial inner peripheries, and means for securing the plates adjacent said side members thereto adjacent their outer radial peripheries.

11. The combination of claim 10 wherein means is provided for holding said side members in predetermined axially spaced relation at their radial inner peripheries.

12. In combination, a spring structure comprising two axially spaced annular disc-like members, an intermediate disc-like member adapted to have radial movement relative said side members, elastic spring segments arranged circumferentially between each side member and said intermediate member and laterally compressed therebetween, and means securing said segments to said intermediate member adjacent the radial inner periphery thereof, and to said side members adjacent the radial outer peripheries thereof.

13. A spring device adapted to be compressed between two parallel disc-like members having relative radial movement, comprising an arcuate rubber segment having thin metallic segment-shaped plates bonded to opposite faces thereof, said segment of rubber having its radial inner and radial outer corners relieved relative to said plates whereby access may be had to said plate corners for fastening them to said parallel members.

14. The spring device of claim 13 further characterized in that one of said plates has its radial inner corners removed and the other of said plates has its radial outer corners removed.

ALFRED O. WILLIAMS.